(12) United States Patent
Kurczynski et al.

(10) Patent No.: US 6,639,710 B2
(45) Date of Patent: Oct. 28, 2003

(54) METHOD AND APPARATUS FOR THE CORRECTION OF OPTICAL SIGNAL WAVE FRONT DISTORTION USING ADAPTIVE OPTICS

(75) Inventors: Peter Kurczynski, Maplewood, NJ (US); John Anthony Tyson, Pottersville, NJ (US)

(73) Assignees: Lucent Technologies Inc., Murray Hill, NJ (US); Agere Systems Guardian Corp., Orlando, FL (US)

( * ) Notice: Subject to any disclaimer, the term of this patent is extended or adjusted under 35 U.S.C. 154(b) by 160 days.

(21) Appl. No.: 09/967,216

(22) Filed: Sep. 29, 2001

(65) Prior Publication Data

US 2003/0063401 A1 Apr. 3, 2003

Related U.S. Application Data

(60) Provisional application No. 60/323,378, filed on Sep. 19, 2001.

(51) Int. Cl.[7] .................. G02B 26/00; H01L 27/148; H04N 5/74
(52) U.S. Cl. .................. 359/290; 359/291; 359/214; 359/224; 359/230; 359/292; 359/295; 257/239; 348/775
(58) Field of Search .................. 359/872, 214, 359/224, 223, 230, 290, 291, 292, 293, 295; 257/72, 239, 415; 348/770, 775; 250/201.9

(56) References Cited

U.S. PATENT DOCUMENTS

| | | | | |
|---|---|---|---|---|
| 4,392,711 A | * | 7/1983 | Moraw et al. | 359/292 |
| 4,626,920 A | * | 12/1986 | Glenn | 348/775 |
| 4,857,978 A | * | 8/1989 | Goldburt et al. | 257/239 |
| 4,900,136 A | * | 2/1990 | Goldburt et al. | 359/291 |
| 5,822,110 A | * | 10/1998 | Dabbaj | 359/295 |
| 5,991,066 A | * | 11/1999 | Robinson et al. | 359/293 |
| 6,381,061 B2 | * | 4/2002 | Levola | 359/291 |

* cited by examiner

Primary Examiner—Loha Ben
(74) Attorney, Agent, or Firm—David W. Herring, Jr.

(57) ABSTRACT

An adaptive optics system is disclosed whereby at least one mirror in the system is manipulated using electrostatic force to selectively attract or repel a portion of the mirror to or from a particular electrode, respectively. This attraction or repulsion is accomplished by mechanically coupling a bound charge layer of dielectric material to at least one surface of the mirror and then placing a voltage across an electrode in an array of electrodes positioned near that mirror. The charge in the dielectric material combined with a suitable electric field makes it possible to attract portions of the mirror in one instant and then, by changing the sign on the voltage placed across the electrode, to repel those same portions in the next instant.

23 Claims, 3 Drawing Sheets

METHOD AND APPARATUS FOR THE CORRECTION OF OPTICAL SIGNAL WAVE FRONT DISTORTION USING ADAPTIVE OPTICS

CROSS-REFERENCE

This application claims the benefit of U.S. Provisional Application No. 60/323,378, filed Sep. 19, 2001 and titled Method and Apparatus for the Correction of Optical Signal Wave Front Distortion Using Adaptive Optics.

FIELD OF THE INVENTION

The present invention is related generally to the correction of distortion of optical signals and, in particular, to the use of adaptive optics to correct that distortion.

BACKGROUND OF THE INVENTION

There are nearly limitless uses for optical signals in many different fields for many different purposes. For example, such signals may be used in communications systems when analog or digital data is modulated upon an optical carrier signal, such as in an optical switch. Signals in such systems are then transmitted from one point to another using fiber optics or via free-space transmissions. Additionally, optical signals collected by telescopes are used in astronomy to view distant astronomical bodies and phenomena. There are also many uses for optical signals in the medical field. For example, by transmitting an optical signal into the human eye, it is possible to detect the light reflected off of the retina in that eye and then create an accurate map of the retina.

The operation of systems using optical signals may be hampered by a variety of factors. For example, distortion of a transmitted planar wave front of the light beam may occur due to any changes in the refractive properties of the medium through which the beam passes, including changes due to temperature variations, turbulence, index of refraction variations or other phenomena. This distortion may cause discrete sections of the wave front to deviate from the orthogonal orientation to the line of travel of the beam as initially transmitted. This distortion may result in significant degradation of the wave front at its destination. In free-space communications systems, any disturbance in the atmosphere between the transmission point and the receiving point may cause certain portions of the beam to move faster than others resulting in the aforementioned wave front distortion. The same is true in astronomical and medical uses. For example, when used to create a map of the human retina, wave front distortion does not typically result from atmospheric disturbance but, instead, results from the light beam passing first into, and then out of, the eye through its lens. The small imperfections on the lens and cornea distort the wave front of the beam much like the distortion seen in communications or astronomical uses. Whatever the particular use, the result is the same: distortion prevents a planar wave front of the beam from being received at its destination in phase.

Adaptive optics uses a wave front sensor to measure phase aberrations in an optical system and a deformable mirror or other wave front compensating device to correct these aberrations. Deformable mirrors change their shape in order to bring the reflected wave front into phase. Until recently, these mirrors were typically deformed via piezoelectric drivers, mechanical screws, or other well-known methods. In recent methods, however, a deformable mirror may be actuated by a technique wherein an array of electrodes is located in electrostatic proximity to that mirror in the optical system. Electrostatic proximity means, as used herein, that by placing a voltage across these electrodes, an attractive force is created between those electrodes and the mirror. This procedure is known as electrostatic actuation. By controlling the attractive force along different portions of the mirror surface, the shape of the mirror may be altered in a known way, thereby at least partially correcting for the wave front distortion. Another adaptive optics method involves using magnetic forces to attract or repel portions of a mirror.

Systems using such deformable mirrors, however, have significant limitations. For example, prior art adaptive optics systems relying on electrostatic actuation to correct the shape of a wave front cannot cause an attraction between a particular electrode and a discrete portion of the mirror in one instant, and then cause a repelling electrostatic force between that particular electrode and that same portion of the mirror the next instant, or vice versa. Additionally, the voltage necessary to create a given pressure at a particular location on the mirror is nonlinearly dependent upon the distance from the mirror to the relevant electrode. Since this distance is always changing (e.g., portions of the mirror would be drawn closer to the electrode when the mirror was actively deformed), the same voltage used in different instances could cause significantly different results in the shape of the mirror at a particular location. Deformable mirrors using magnetic force to alter the shape of a mirror in order to correct the shape of the wave front also have significant limitations. For example, such mirrors required electric coils that, when energized, created significant heat. This heat has the effect of rendering the mirrors unsuitable for certain uses (e.g., infrared imaging) and, in extreme cases, could result in undesirable thermal stresses to various components of the system.

SUMMARY OF THE INVENTION

The aforementioned problems related to wave front distortion correction are solved by the present invention. In accordance with the present invention, a bound charge is integrated within a mirror or in a material mechanically coupled with the mirror. A portion of the bound charge layer near a particular electrode in a first group of electrodes located in electrostatic proximity to the bound charge layer will alternately be attracted or repelled from that particular electrode by changing the sign of the voltage across that electrode. Thus, the mirror that is mechanically coupled to this bound charge layer will similarly be attracted or repelled from that particular electrode. In one embodiment, a second group of electrodes located on the opposite side of the mirror from the first group of electrodes may be used to define the electrical field and enhance the ability of a particular electrode in the first group to selectively attract or repel a particular portion of the mirror. It is advantageous to arrange the groups of electrodes in planes.

DETAILED DESCRIPTION OF THE INVENTION

Figure 1:
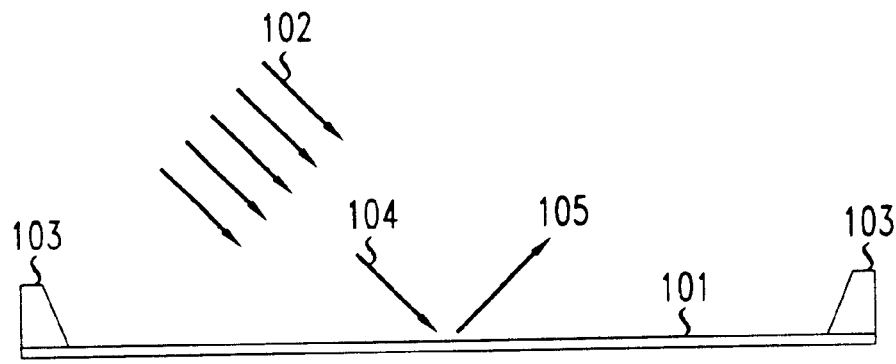
FIG. 1 shows a prior art mirror redirecting an incoming light beam in a new direction.

FIG. 1 shows a prior art structure utilizing a mirror 101 to reflect or focus light beam 102. Light beam 102 may be an optical signal passing through an optical network switch, an optical signal in a free-space optical communications system, light reflected from a portion of the human eye, or a light beam in any other application whereby a mirror is used to focus or alter the path of the beam. The mirror 101 may be created by etching a silicon substrate with one side of the substrate deposited with one or more layers of material such as silicon nitride, single crystal silicon, polysilicon, polyimide, or other known materials, using methods that are well known in the art.

In order to create an easily-deformable mirror, the material is typically etched, leaving side walls 103, until a membrane of as little as 1 micron remains. The membrane is reflective such that, upon reaching the mirror, light beam 102 traveling in direction 104 is reflected from the surface of the mirror and is redirected in direction 105. A metallic coating (e.g., aluminum) may be formed on this membrane to enhance reflectivity. Tension is maintained in mirror 101 by connecting side walls 103 to a supporting frame using well known methods.

As previously discussed, wave front distortion may result when any changes to the refractive properties of the transmitting medium are encountered along the line of travel 104 of the light beam. These changes may cause discrete sections of the wave front of the beam to deviate from their transmitted, orthogonal orientation to the line of travel 104 of the beam 102. The result is a distortion of the image of the wave front when it reaches its destination, which may be for example a mirror, a focal plane of a telescope, an optical wave front sensor (e.g., a curvature wave front sensor or a Shack-Hartman wave front sensor), or any other destination. By way of example, in optical communications systems, distortion may result in significant degradation of the communications signal or even the total loss of communications.

Figure 2:
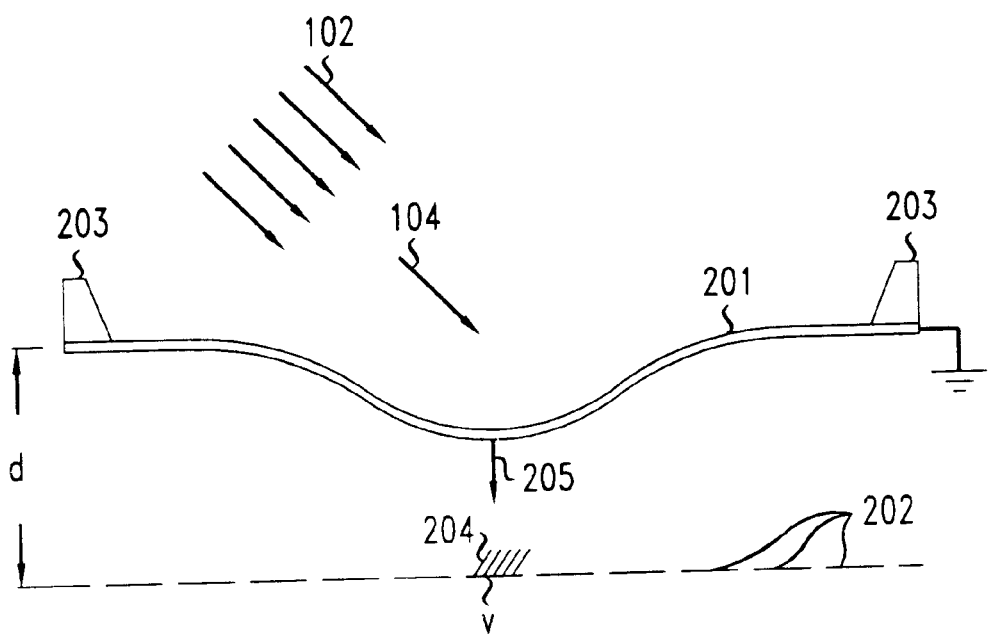
FIG. 2 shows a prior art mirror wherein electrostatic force generated by a plane of electrodes is used to alter the shape of the mirror.

FIG. 2 shows the structure of FIG. 1 wherein electrostatic force is used to deform the reflective surface of the mirror to correct for wave front distortion of the light beam 102 in accordance with the prior art. The mirror 201 illustrated in FIG. 2 can at least partially correct for the effects of wave front distortion. By measuring the aforementioned distortion using well-known techniques, the shape of the mirror necessary to correct for that distortion is determined. The mirror 201, which is suspended between side walls 203 and is grounded, is deformed using an electrostatic force that is created by passing a voltage across at least one electrode in a plane 202 of electrodes a distance d below the mirror 201. By then selectively placing a voltage across one or more of those electrodes, such as electrode 204, located directly beneath the area of mirror 201 to be deformed, that area is attracted toward electrode 204 in direction 205. The result of passing various voltages across individual electrodes in plane 202 deforms the different sections of the mirror in a way such that, when the light beam is incident upon the mirror 201, the aforementioned wave front deformation is reduced. The aforementioned technique for correcting wave front distortion by detecting said distortion and translating that information into discrete voltages to create deformation of a mirror is well known in the art. An example of this method and apparatus, used in a free space optical communications system, is described in the co-pending U.S. patent application titled "Method and Apparatus for the Correction of Optical Signal Wave Front Distortion Within a Free-Space Optical Communications System," having Ser. No. 09/896,804, filed Jun. 29, 2001.

Figure 3:
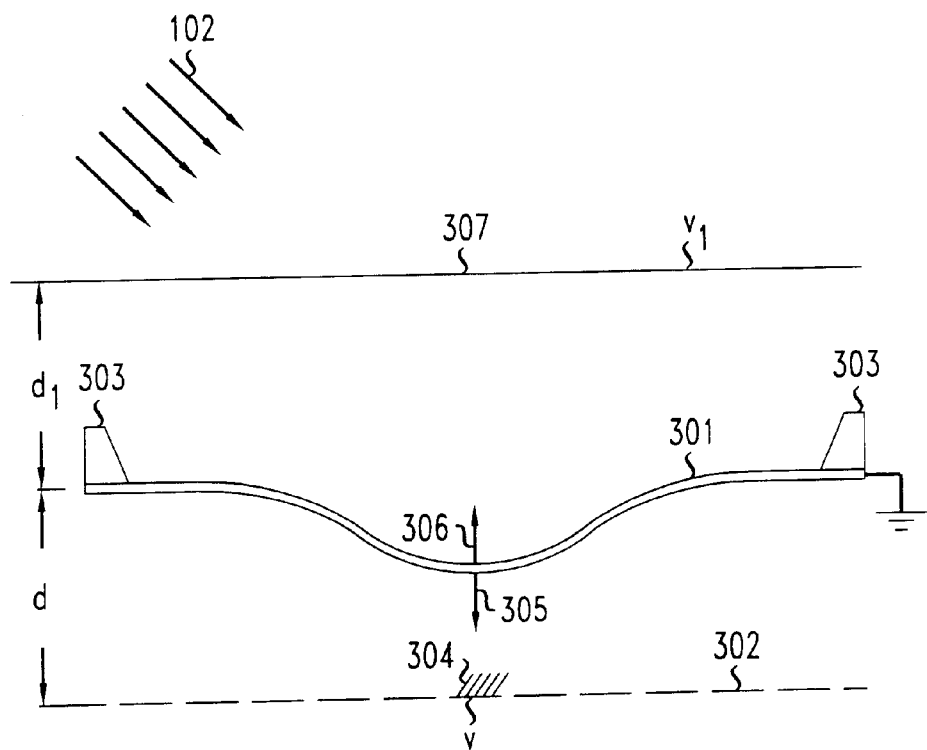
FIG. 3 shows a prior art mirror wherein a second plane of electrodes in the optical path is used to increase the degree of deformation of the mirror.

FIG. 3 shows the structure of FIG. 2 wherein the reflective surface of mirror 301, which is suspended between side walls 303 and is grounded, can compensate for a greater degree of wave front distortion than the embodiment in FIG. 2. As previously discussed, the side walls 303 are mounted to a support structure using well known methods. The greater degree of compensation afforded by the embodiment in FIG. 3 is accomplished by adding a second electrode plane 307 at a distance $d_1$ from that mirror on the opposite side of the mirror 301 from the first plane 302 of electrodes. As plane 307 is in the optical path of the light beam, that plane may consist of a transparent electrode, a circular electrode ring, or any other electrode type that will not significantly obstruct the path of the beam. When voltage $V_1$ is placed across electrode 307, mirror 301 is drawn toward that electrode in direction 306. As in the embodiment shown in FIG. 2, by passing a voltage across electrode 304, the mirror will be attracted toward that electrode in direction 305. Such a wider range of movement in either direction 305 or direction 306 facilitates correction of a greater degree of wave front distortion of the light beam 102.

Systems using the prior art mirror structures of FIGS. 1, 2, and 3 have significant limitations. These systems cannot cause an attraction between a particular electrode and a discrete portion of the mirror in one instant, and then cause a repelling electrostatic force between that particular electrode and that same portion of the mirror the next instant, or vice versa. Additionally, the voltage necessary to create a given pressure at a particular location on the mirror is nonlinearly dependent upon the distance from the mirror to the relevant electrode. Since this distance is always changing (e.g., portions of the mirror would be drawn closer to the electrode when the mirror was actively deformed), the same voltage used in different instances could cause significantly different results in the shape of the mirror at a particular location.

Figure 4:
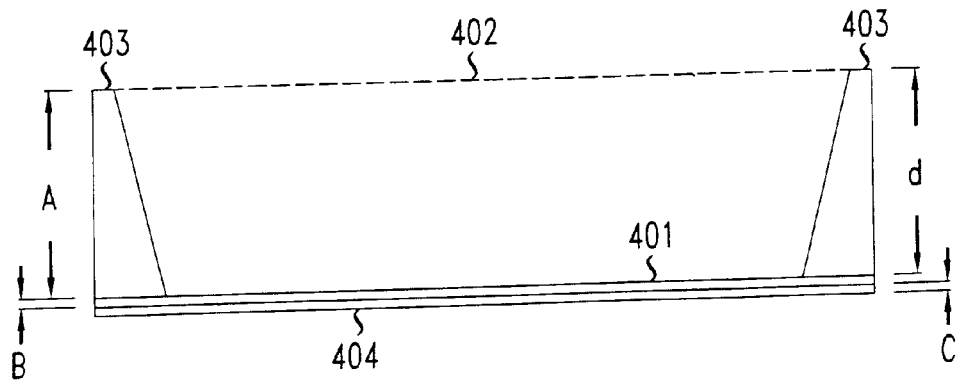
FIG. 4 shows a mirror in accordance with one embodiment of the present invention wherein a bound charge layer is affixed to the mirror.

FIG. 4 shows a structure in accordance with one embodiment of the present invention wherein a bound charge layer of material 404 is affixed or otherwise mechanically coupled to a surface of the mirror 401. A bound charge, as used herein, is a permanent or semi-permanent electric polarization of a dielectric material. Such a polarization can be created, for example, by implanting charges in a dielectric material. Additionally, a ferroelectric layer may be polarized or the dielectric material may be exposed to ionizing radiation. Mechanical coupling with a mirror, as used herein, means that the bound-charged layer is integrated with the mirror; or is in contact with the mirror through a layer or layers of intermediate material or through another structure or structures (e.g., one or more posts or springs connecting the bound charge layer to the mirror).

Mirror 401 of thickness B may be produced, as discussed previously, by etching a substrate of thickness D of silicon with one side of the substrate deposited with a layer of material such silicon nitride, single crystal silicon, polysilicon, polyimide, or other known materials using well-known methods. Etching from surface 402 will result in side walls 403 of depth A (typically on the order of 5 millimeters) and reflective mirror surface 401. The material forming the side walls 403 may be retained in the operational mirror as such material adds rigidity to the mirror structure. Etching a substrate to create membrane mirrors is only intended to be representative in nature. Any other method for creating a mirror capable of being deformed electrostatically may be used to implement the present invention.

A layer 404 of dielectric material of thickness C is affixed to the surface of the etched substrate opposite from the etched surface. An illustrative material suitable for this purpose is Teflon® (or another dielectric material) which may be spin-coated or deposited or grown onto the substrate to create a layer of material one or a few microns thick. Once this layer 404 is formed, a persistent bound charge may be implanted therein via a corona discharge in a plasma with a DC electric field, or via other well known methods. Using such a discharge, a charge is created within the layer 404 of Teflon® of a density from $10^{-7}$ to $10^{-9}$ C/cm² that is persistent for many years under a variety of conditions. While a charge in Teflon® created in the above manner creates an acceptable bound charge layer, other methods of mechanically coupling a bound charge layer to the mirror are also possible. For instance, the mirror itself may be constructed of a material suitable for holding a charge. Alternatively, a charge may be created semi-permanently in the mirror by attaching a capacitor to it.

Figure 5:
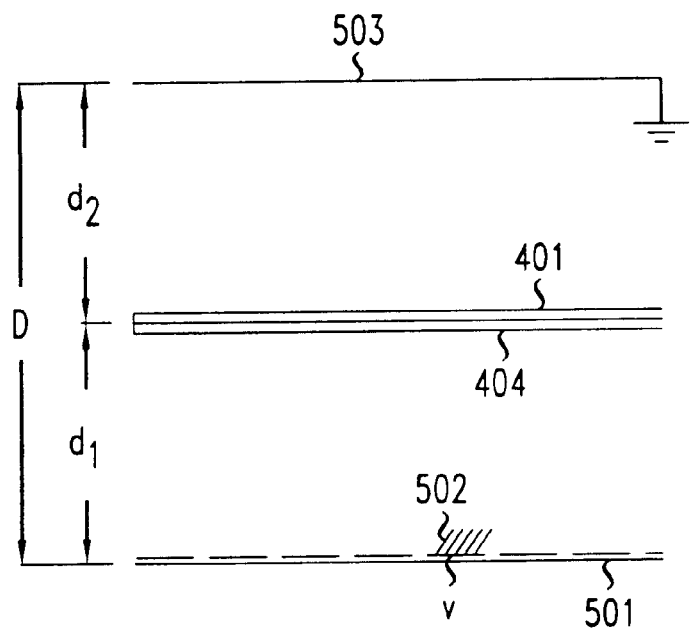
FIG. 5 shows the mirror of FIG. 4 wherein a first plane of electrodes and a second plane of electrode, on opposite sides of the mirror respectively, are used to define the electrical field around the mirror.

FIG. 5 shows an adaptive optics embodiment of the structure of FIG. 4. In this embodiment, the mirror 401 is supported between two electrode planes, 501 and 503. Electrode plane 503 serves to add an electric field with known characteristics above the bound charge layer. This field enables a greater degree of control of the mirror 401. The two planes 501 and 503 are separated by distance D and may advantageously be placed at an equal distance from bound charge layer 404 (i.e., $d_1=d_2$). In operation, an optical signal is received by an optical system within which mirror 401 is supported. A well-known wave front sensing technique (e.g., using a Shack-Hartman or a curvature wave front sensor) is used to measure distortions in the wave front of the optical signal. If distortions are detected, well-known techniques are used to determine the deformation of mirror 401 necessary to compensate for that distortion. As previously discussed, placing a voltage across individual electrodes, such as electrode 502 within plane 501, will result in a deformation of the mirror 401. Such electrodes may be arranged advantageously in an array in a way such that, by placing individually-controlled voltages across multiple electrodes in the array, multiple areas on the surface of the mirror 401 can be deformed to compensate for the aforementioned wave front distortion. Since a bound charge is implanted into the dielectric material 404 mechanically coupled to the mirror 401, and because the electric field above the bound charge layer is known, changing the sign of the voltage passed over that electrode will result in a different, known direction of deformation. If the sign is the same as the sign of the bound charge, the area of bound charge layer 404, and hence mirror 401, nearest to the respective electrode will be repelled away from that electrode. On the other hand, if the sign of the voltage passed across the electrode is the opposite of the sign of the bound charge, the bound charge layer 404 and mirror 401 will be attracted to that electrode. Electrode plane 503 is transparent and is in the optical path of the light beam. This plane is a ground connection that, together with electrode 502 and mirror 401 with dielectric material 404, serves to define the electric field geometry and adds predictability to the resulting deformation of the mirror 401 compared with the case where such a transparent electrode is not used. For the case where distance $d_2$ in FIG. 4 is equal to distance $d_1$, and for small displacements of the bound charge layer 404, the pressure exerted on the bound charge layer 404 may be defined by the relationship:

$$P=\sigma V/D \quad \text{(Equation 1)}$$

wherein P is the pressure exerted upon the mirror, σ is the charge density bound within dielectric layer 404, and D is the distance between the two planes of electrodes in FIG. 5. For the case where d2 is different from d1, this equation becomes:

$$P=\sigma V/D-\sigma^2[(d2-d1)/(2\epsilon_o D)] \quad \text{(Equation 1a)}$$

The pressure exerted on a prior art mirror such as used in FIG. 2 is defined by the relationship:

$$P=\tfrac{1}{2}(\epsilon_o V^2/d^2) \quad \text{(Equation 2)}$$

wherein P, once again, is the pressure exerted on the mirror, $\epsilon_o$ is a constant ($8.87\times10^{-12}$ μm), V is the voltage passed over the relevant electrode, and d is the distance from the mirror to the plane of the relevant electrode. In the case of the mirror as used in FIG. 3, wherein two planes of electrodes are used, the pressure exerted upon the mirror potentially depends upon two different planes of electrodes. In this case, the pressure is defined by the relationship:

$$P=\tfrac{1}{2}\epsilon_o\{(V^2/d^2)-(V_1^2/d_1^2)\} \quad \text{(Equation 3)}$$

wherein P is the pressure upon the mirror at a particular location, $\epsilon_o$ is a constant, V is the voltage applied to an electrode 304 in FIG. 3 in plane 302, d is the distance from the mirror to electrode 304, $V_1$ is the voltage applied to electrode 308 in FIG. 3 within plane 307, and $d_1$ is the distance from the mirror to electrode 308.

As is readily apparent from the equations, in accordance with the present invention where $d_2=d_1$ in FIG. 5, the pressure exerted on the bound charge layer 404 in FIG. 5 defined by Equation 1 is entirely independent from the distance of the mirror from any individual plane of electrodes. For any given distance between planes 501 and 503 in FIG. 5, this pressure is directly linear with the voltage applied to the electrodes in plane 501. Controlling the pressure exerted upon the bound charge layer 404 is a matter of varying the voltage V applied to the electrode 502. In the prior art cases described by Equations 2 and 3, the pressure exerted upon the mirror is dependent upon both the square of the voltage V and $V_1$ and inversely upon the square of the distance from each plane of electrodes, 302 and 307 respectively. As a result, the necessary voltage V (or $V_1$) to achieve a unit increase in pressure P constantly changes with the change in the distances d and $d_1$ from the mirror to the planes of electrodes. Therefore, varying the pressure upon the mirror in these prior art cases requires a complex control algorithm.

Figure 6:
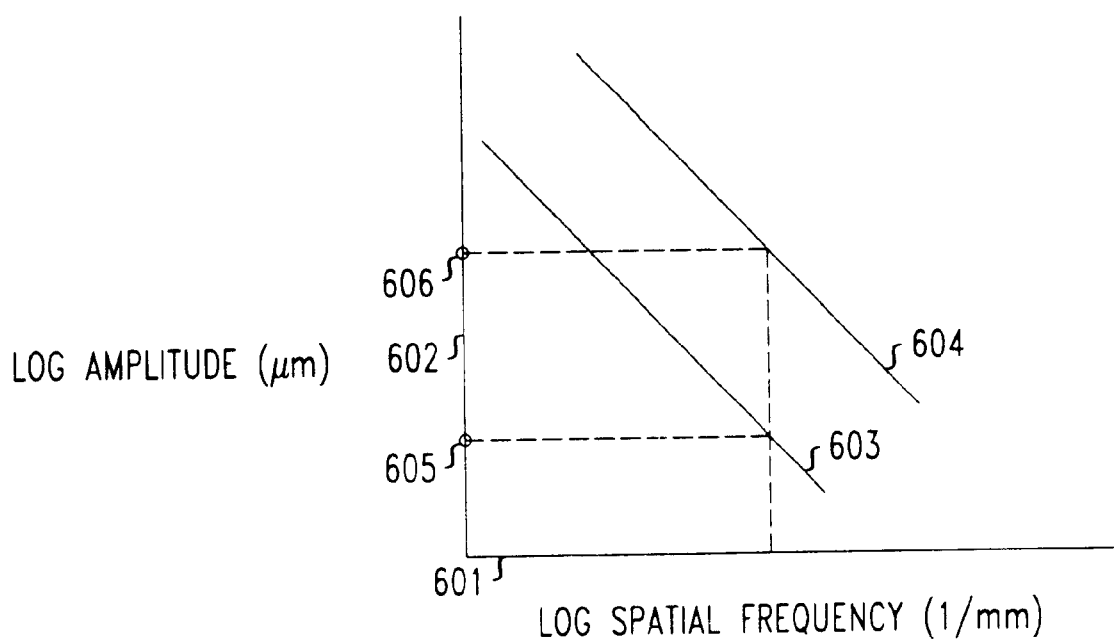
FIG. 6 shows a graph showing the relationship between spatial frequency and amplitude of deformation of both prior art mirrors and the mirror in FIG. 4.

FIG. 6 shows a graph of the amplitude of displacement of the mirror, 401 in FIG. 5, as a function of the spatial frequency of the membrane forming the mirror. Spatial frequency measures the degree of complexity of the mirror shape that the device may accommodate, and hence the complexity of wave front distortion that the device can correct. Increasing the electrostatic pressure (e.g., by increasing the voltage across an electrode) increases the spatial frequency response of the membrane, represented by axis 601. Line 603 represents the relationship between spatial frequency and the amplitude of the displacement of the prior art mirror 301 in FIG. 3 used in conjunction with a single plane of electrodes. Line 604 represents the same relationship for the embodiment of the present invention shown herein in FIG. 5 where a bound charge layer is used in conjunction with two planes of electrodes. Both line 603 and 604 vary inversely with the square of the spatial frequency, i.e. the amplitude of displacement of the membrane decreases as spatial frequency increases. However, for a given spatial frequency 605, the prior art membrane of FIG. 3 will only exhibit displacement amplitude 605, while the mirror used in the embodiment of the present invention will exhibit a significantly higher displacement amplitude 606. As a result, when using the mirror in accordance with the principles of the present invention, less voltage is required to achieve the same displacement as in the prior art.

The foregoing merely illustrates the principles of the invention. It will thus be appreciated that those skilled in the art will be able to devise various arrangements that, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Diagrams herein represent conceptual views of mirrors and light beams. Diagrams of optical components are not necessarily shown to scale but are, instead, merely representative of possible physical arrangements of such components.

What is claimed is:

1. Apparatus comprising:
    a mirror; and
    a bound charge layer mechanically coupled to said mirror.

2. The apparatus of claim 1 further comprising a first group of electrodes disposed in electrostatic proximity to said bound charge layer.

3. The apparatus of claim 2 further comprising a second group of electrodes disposed in electrostatic proximity to said bound charge layer.

4. The apparatus of claim 3 wherein said mirror is disposed in a location between said first group of electrodes and said second group of electrodes.

5. The apparatus of claim 3 wherein the group of electrodes comprises a circular ring of electrodes.

6. The apparatus of claim 2 wherein the first group of electrodes is in an optical signal path of an optical system.

7. The apparatus of claim 2 wherein said first group of electrodes are disposed in a plane.

8. The apparatus of claim 1 wherein said bound charge layer is integrated into the mirror.

9. The apparatus of claim 1 wherein said bound charge layer is in direct physical contact with said mirror.

10. The apparatus of claim 1 wherein said bound charge layer is a layer of dielectric material.

11. The apparatus of claim 1 wherein said bound charge layer is bound within at least one layer of a first material, said first material connected by at least one intermediate layer of a second material to at least one surface of said mirror.

12. The apparatus of claim 1 wherein said bound charge layer is bound within at least one layer of a material, said material connected by at least one connecting structure to at least one surface of said mirror.

13. The apparatus of claim 1 wherein said bound charge layer further comprises an electrically charged capacitor attached to said mirror.

14. A method for use in an optical system comprising at least one bound charge layer mechanically coupled to at least one mirror, wherein at least one group of electrodes is located in electrostatic proximity to said bound charge layer, said method comprising:
    applying, in response to a detection of wave front distortion, a positive or a negative voltage across at least one electrode in said at least one group of electrodes.

15. The method of claim 14 wherein said mirror is disposed between two groups of electrodes.

16. The method of claim 15 wherein at least one group of electrodes is disposed in a plane.

17. Apparatus comprising:
    a mirror;
    a bound charge layer mechanically coupled to said mirror; and
    means for exerting an electrostatic force upon said bound charge layer.

18. The apparatus of claim 17 wherein said means for exerting an electrostatic force comprises at least one group of electrodes disposed in electrostatic proximity to said bound charge layer.

19. Apparatus comprising:
    a plurality of mirrors, wherein each of said mirrors is mechanically coupled to a corresponding plurality of bound charge layers.

20. The apparatus of 19 further comprising means for exerting an electrostatic force upon at least one bound charge layer in said plurality of bound charge layers.

21. The method of claim 20 wherein said means for exerting an electrostatic force comprises means for placing a voltage across at least one electrode in at least one group of electrodes, said group located in electrostatic proximity to at least one mirror in said plurality of mirrors.

22. The method of claim 21 wherein said plurality of mirrors are disposed in an electrical field.

23. The apparatus of claim 19 wherein said apparatus comprises an optical networking switch.

* * * * *